(12) United States Patent
Mayrand

(10) Patent No.: US 7,892,424 B2
(45) Date of Patent: Feb. 22, 2011

(54) DECENTRALIZED SOURCE SEPARATION SEWAGE SYSTEM

(75) Inventor: Paul Mayrand, Ville Saint-Laurent (CA)

(73) Assignee: Societe EG06 Inc., Ville Saint-Laurent, Quebec (CA)

( * ) Notice: Subject to any disclaimer, the term of this patent is extended or adjusted under 35 U.S.C. 154(b) by 133 days.

(21) Appl. No.: 12/419,614

(22) Filed: Apr. 7, 2009

(65) Prior Publication Data

US 2009/0250386 A1 Oct. 8, 2009

Related U.S. Application Data

(60) Provisional application No. 61/042,820, filed on Apr. 7, 2008, provisional application No. 61/053,466, filed on May 15, 2008.

(51) Int. Cl.
*C02F 3/08* (2006.01)
*C02F 9/14* (2006.01)

(52) U.S. Cl. .................. 210/151; 210/195.1; 210/196.3; 210/259; 210/523

(58) Field of Classification Search .................. 210/150, 210/151, 195.1, 195.3, 258, 259, 523, 524, 210/619
See application file for complete search history.

(56) References Cited

U.S. PATENT DOCUMENTS

| | | | | |
|---|---|---|---|---|
| 2,266,937 A | * | 12/1941 | Tark | 210/524 |
| 3,360,926 A | | 1/1968 | Parr | |
| 3,860,355 A | | 1/1975 | Dell | |
| 3,886,074 A | * | 5/1975 | Prosser | 210/150 |
| 3,907,454 A | | 9/1975 | Punton | |
| 3,932,273 A | * | 1/1976 | Torpey et al. | 210/151 |
| 4,054,031 A | | 10/1977 | Johnson | |
| 4,093,539 A | * | 6/1978 | Guarino | 210/150 |
| 4,268,385 A | * | 5/1981 | Yoshikawa | 210/150 |
| 4,326,132 A | | 4/1982 | Bokel | |
| 4,363,212 A | | 12/1982 | Everett | |
| 4,522,714 A | | 6/1985 | Thissen | |
| 4,742,242 A | | 5/1988 | De Shon | |
| 4,805,406 A | | 2/1989 | Grsetic | |
| 4,981,015 A | | 1/1991 | Simpson | |
| 5,326,459 A | * | 7/1994 | Hlavach et al. | 210/150 |

(Continued)

FOREIGN PATENT DOCUMENTS

BE 1002838 A3 6/1991

(Continued)

OTHER PUBLICATIONS

International Application No. PCT/CA2009/000441: International Search Report Dated Jun. 29, 2009.

*Primary Examiner*—Christopher Upton
(74) *Attorney, Agent, or Firm*—Louis B. Allard; Borden Ladner Gervais LLP

(57) ABSTRACT

An apparatus and method for treating sewage The apparatus receives sewage at a receiving compartment and separates solids from liquids at the receiving compartment. The solids can be extracted from the receiving compartment by an auger. The liquid sewage flows through a series of treatment compartment containing rotating biological contactor discs for treatment by these rotating biological contactor discs. The rotating biological contactor discs are secured to a rotating shaft. The rotating shaft and the auger are powered by a quasi-submerged turbine displaced by a flow of air.

27 Claims, 15 Drawing Sheets

U.S. PATENT DOCUMENTS

| | | | |
|---|---|---|---|
| 5,395,529 A | | 3/1995 | Butler |
| 5,407,578 A | * | 4/1995 | Nathwani ............... 210/619 |
| 5,665,236 A | * | 9/1997 | Van Den Berg ............ 210/151 |
| 6,106,716 A | * | 8/2000 | Berkman ............... 210/195.1 |
| 6,195,991 B1 | | 3/2001 | De Shon |
| 6,447,243 B1 | | 9/2002 | Kittle |
| 6,534,881 B1 | | 3/2003 | Slavchev |
| 6,631,613 B1 | | 10/2003 | De Shon |
| 6,769,253 B1 | | 8/2004 | Scharfenberg |
| 6,773,585 B1 | * | 8/2004 | Troubounis et al. ........ 210/523 |
| 6,798,081 B1 | | 9/2004 | Brehob |
| 6,949,191 B1 | * | 9/2005 | Petrone ............... 210/619 |
| 6,990,809 B2 | | 1/2006 | Abouraphael |
| 7,083,720 B2 | * | 8/2006 | Miller ............... 210/150 |
| 7,216,483 B2 | | 5/2007 | Takeuchi |
| 2003/0214589 A1 | | 11/2003 | Shibutani |
| 2005/0252206 A1 | | 11/2005 | Holmevik et al. |
| 2008/0135474 A1 | * | 6/2008 | Limcaco ............... 210/150 |

FOREIGN PATENT DOCUMENTS

| | | |
|---|---|---|
| CA | 984787 | 3/1976 |
| CA | 1273720 | 9/1990 |
| CA | 2125177 | 6/1993 |
| CA | 2387387 | 11/2003 |
| DE | 4029150 | 4/1992 |
| DE | 4105581 | 9/1992 |
| DE | 9215449 | 1/1993 |
| DE | 29500117 | 3/1995 |
| DE | 19730252 | 1/1999 |
| DE | 102005041899 | 3/2007 |
| EP | 0161077 | 11/1985 |
| EP | 1426615 | 6/2004 |
| EP | 1528254 | 5/2005 |
| FR | 1355149 | 4/1963 |
| FR | 2276479 | 1/1976 |
| FR | 2491154 | 4/1982 |
| FR | 2844308 | 3/2004 |
| FR | 2864174 | 6/2005 |
| FR | 2897902 | 8/2007 |
| GB | 2069619 | 8/1981 |
| GB | 2190965 | 12/1987 |
| GB | 2213533 | 8/1989 |
| GB | 2229228 | 9/1990 |
| GB | 2230058 | 10/1990 |
| GB | 2350159 | 11/2000 |
| GB | 2417526 | 3/2006 |
| WO | 96/36810 | 11/1996 |
| WO | 2004/053329 A1 | 6/2004 |

* cited by examiner

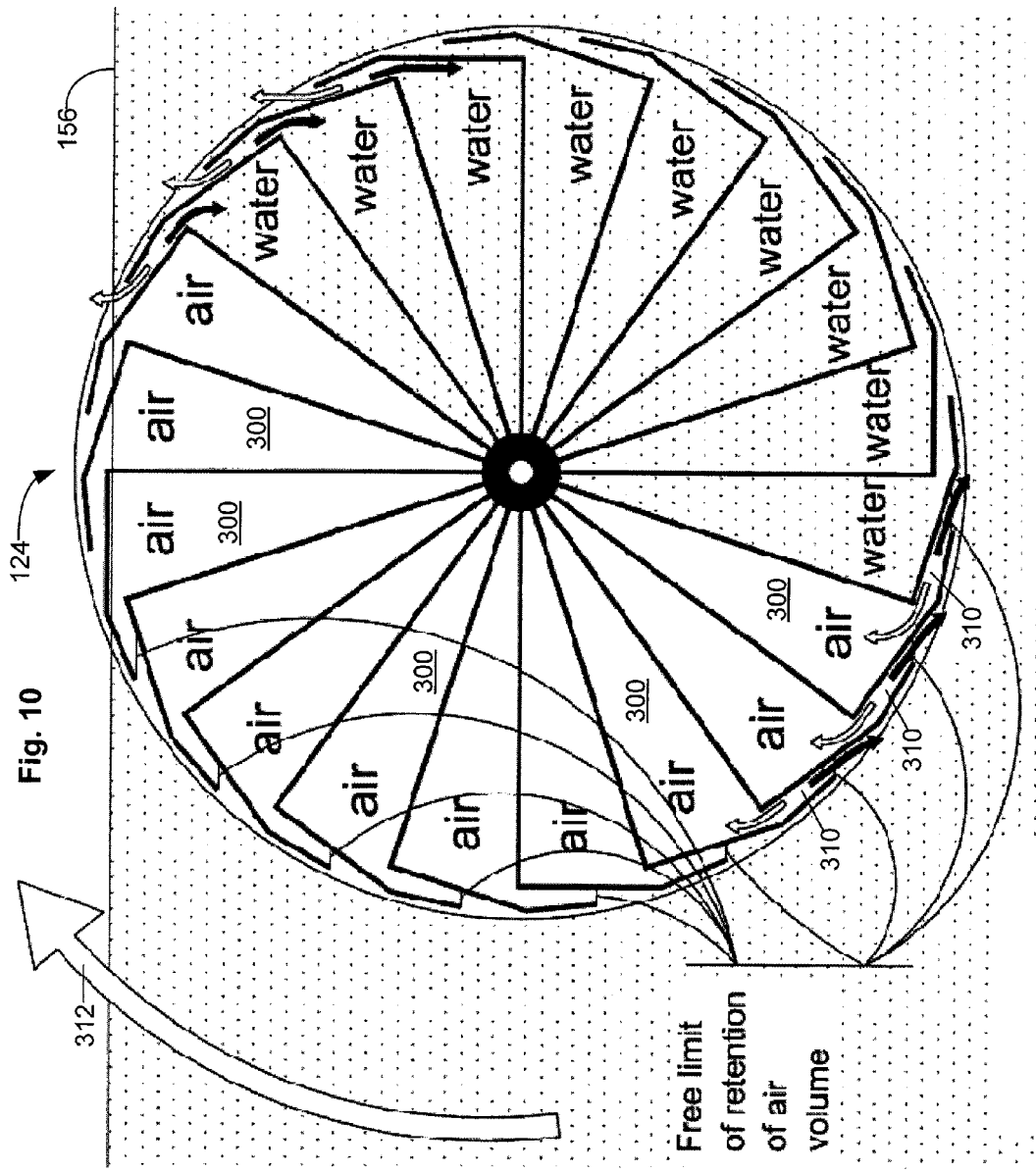

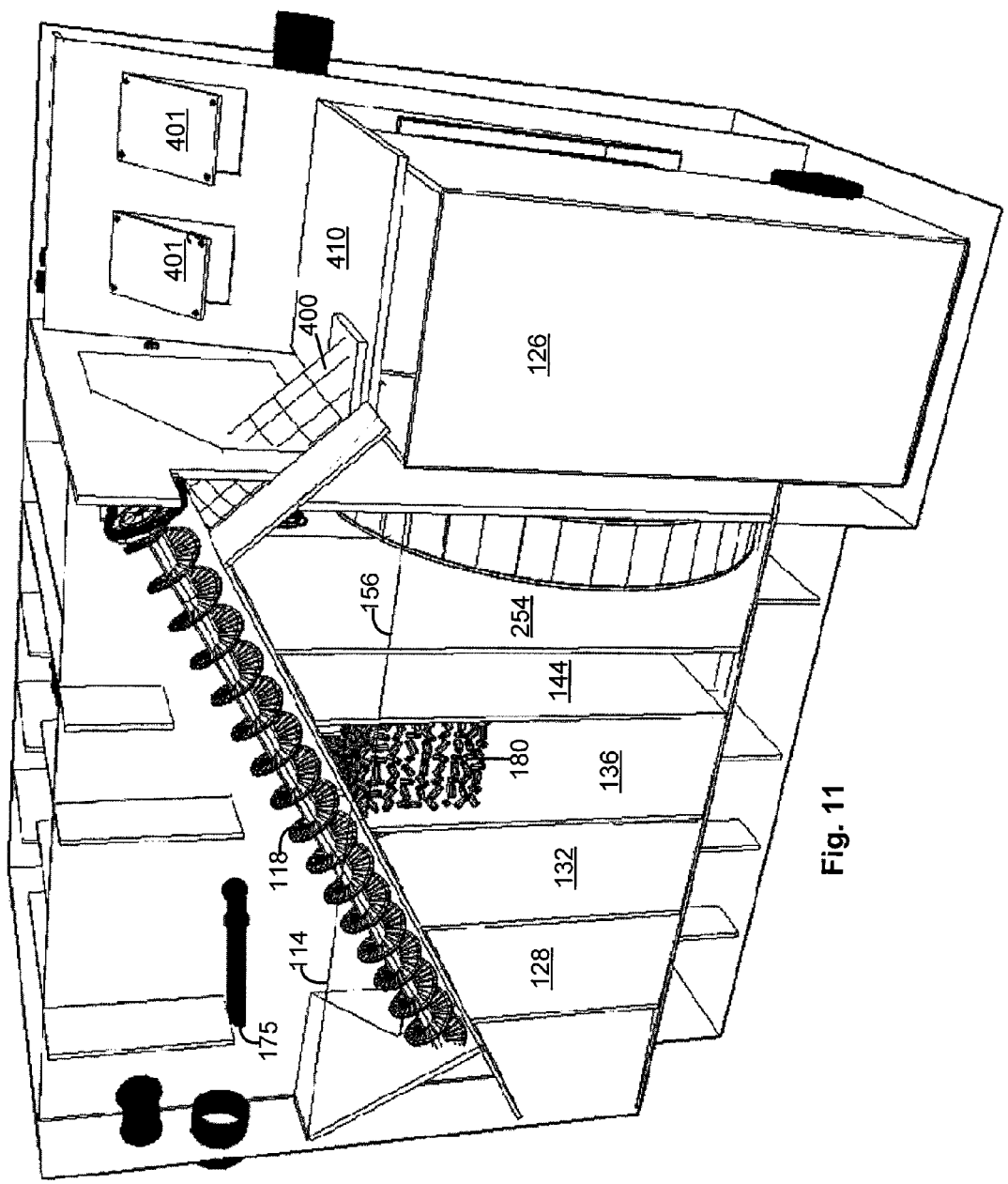

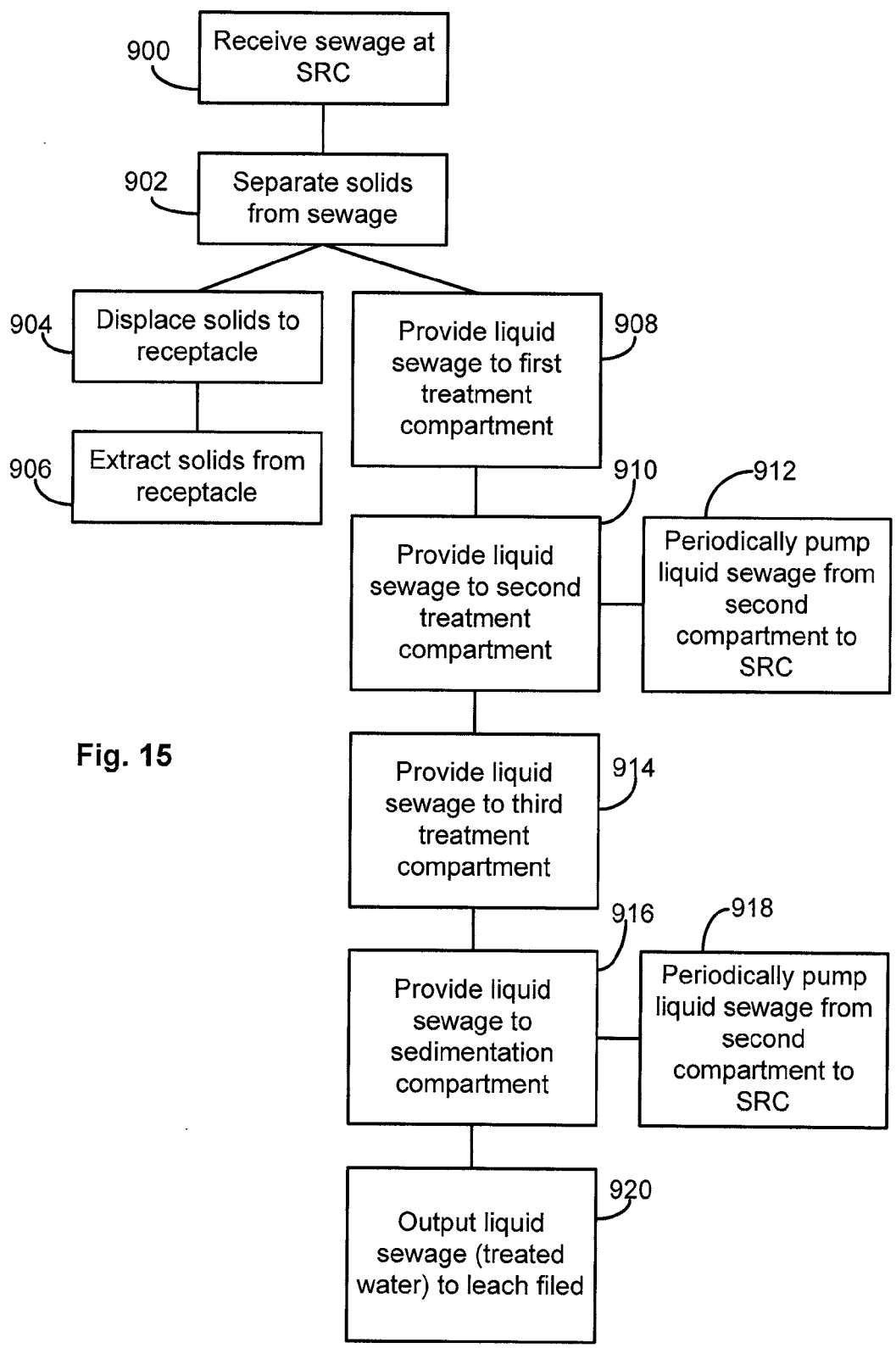

DECENTRALIZED SOURCE SEPARATION SEWAGE SYSTEM

CROSS REFERENCE TO RELATED APPLICATIONS

This application claims the benefit of priority of U.S. Provisional Patent Application No. 61/053,466 filed May 15, 2008, and of U.S. Provisional Patent Application No. 61/042,820 filed Apr. 7, 2008, both which are incorporated herein by reference in their entirety.

FIELD OF THE INVENTION

The present invention relates generally to sewage systems. More particularly, the present invention relates to decentralized sewage systems.

BACKGROUND OF THE INVENTION

Water management is becoming increasingly important, especially in water-scarce regions of the world, such as, for example, the Sun Belt in the U.S.A. In such regions, water taxes are usually high and, as such, there is a strong incentive to conserve and recover water.

Further, the management and treatment of sewage water is also becoming increasingly important due to costs associated thereto, environmental concerns, and stricter disposal criteria.

In areas were a municipal sewage system is not available, decentralized sewage systems such as, for example, septic tanks can be used. Such septic tanks usually have two compartments, with a first compartment receiving wastewater, and the second compartment outputting treated water to a leach field (also referred to as a drain field or seepage filed), which can span over a large area, for example, from 200 to 300 $m^2$ for a three-bedroom house. Solids in the wastewater fall to the bottom of the first compartment while scum floats to the surface. A divider between the first and second compartments has an opening that allows scummy water to flow from the first to the second compartment where additional settling of solids in the water can occur. Anaerobic bacterial activity in the first and second compartments turns the solid deposits into sludge. The liquid present in the second compartment proceeds through the output of the septic tank, into the leach field where the impurities present in the water decompose in the soil.

Septic tanks must be cleaned out of their sludge on a regular basis. This typically involves a service truck pumping out the compartments of a tank and bringing the sludge to a municipal sewage treatment plant where the sludge is dumped and treated.

Characteristically, at such sewage treatment plants, the sludge mixes in with various pollutants and chemical generated by industries that also use the municipal sewage treatment plant. This causes sludge constituents to bind to these pollutants and chemicals to produce toxins that can be extremely difficult to eliminate. Typically, such toxins are eliminated by a costly burning process.

Decentralized sewage systems, other than septic tank systems, include those using rotating biological contactor disks (RBCDs) placed in a container vessel receiving sewage water. In such systems, space-apart disks are mounted on a rotating shaft and are partially submerged in sewage water. The RBCDs, which can be made of plastic, or of any other suitable material, accumulate bacteria over time. As the RBCDs rotate in the sewage water, the bacteria capture and digest matter of the sewage water. As the RBCDs rotates out the water and become exposed to air, the aeration facilitates the digestion of the matter by the bacteria formed on the RBCDs, which turns the sewage matter into biomass on the RBCDs. The treated sewage water is output from the vessel into a leach field.

After a period of time over which the RBCDs accumulate biomass, the biomass will break off from the RBCDs and fall to the bottom of the vessel. Regular pumping of the biomass accumulated at the bottom of the vessel is required.

Typically, the sewage water arrives directly into the vessel and dissolves therein. As such, a large number of RBCDs are required to ensure adequate treatment of the sewage water. Additionally, RBCD systems typically require an electrical motor to rotate the shaft and disks. The motor has to operate in a constantly humid environment and, as such, is prone to short and medium term failures, in which cases, the efficiency of the sewage treatment system falls off drastically.

It is, therefore, desirable to provide a decentralized sewage treatment that allows for separation of solid matter at the source, that has operational reliability, that has a small leach field footprint and that produces reusable water.

SUMMARY OF THE INVENTION

It is an object of the present invention to obviate or mitigate at least one disadvantage of previous sewage treatment systems.

In a first aspect, the present invention provides an apparatus for treating sewage, with the sewage including water and waste products. The apparatus comprises a housing and a sewage receiver compartment formed within the housing. The sewage receiver compartment has a sewage inlet to receive the sewage therefrom. The sewage receiver compartment has a bottom portion. Some of the waste products in the sewage to sink to the bottom portion to form a solid matter deposit. The apparatus further comprises a first treatment compartment formed within the housing. The first treatment compartment is in fluid communication with the sewage receiver compartment. The first treatment compartment is to receive the sewage from the sewage receiver compartment. The apparatus further comprises an auger mounted within the housing, the auger having first and second ends. The first end is disposed at the bottom portion of the sewage receiver compartment. The apparatus also comprises a receptacle disposed outside the sewage receiver compartment, adjacent the second end of the auger. The apparatus further comprises a rotatable shaft mounted in the housing. The rotatable shaft extends through the first treatment compartment. The rotatable shaft has a biological contactor material secured thereto. The biological contactor material is disposed in the first treatment compartment. The apparatus further comprises a turbine compartment formed within the housing and in fluid communication with the first treatment compartment. A turbine is rotatably mounted in the turbine compartment and operationally connected to the rotatable shaft and to the second end of the auger. The apparatus further comprises an air source operationally coupled to the turbine. The air source is to turn the turbine and the turbine is to rotate the rotatable shaft to cause the biological contactor material successively passing though the sewage, and through air, as the rotatable shaft rotates. The successive passage of the biological contactor material through the sewage and through the air causes microorganisms to form on the biological contactor material and to consume a portion of the waste products present in the sewage in order to produce treated water. The turbine also rotates the auger. The auger displaces, upon rotation, the solid matter deposit from the bottom portion of the sewage receiver compartment to the receptacle. The apparatus further comprises an outlet in fluid communication with the first treatment compartment, and with a leach field, to output the treated water to the leach field.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 10 shows a front functional view of the turbine of FIGS. 9A and 9B;

FIG. 11 shows a side view of the apparatus of FIG. 4;

FIG. 15 shows an exemplary method of treating sewage of the present invention.

DETAILED DESCRIPTION

Generally, the present invention provides a system and method for treating sewage and used water where they are generated, rather than at a centralized treatment plant. The system, or apparatus, receives sewage at a receiving compartment and separates solids from liquids at the receiving compartment. The solids are extracted from the receiving compartment by an auger. The liquid sewage flows through a series of treatment compartment containing rotating biological contactor discs (RBCDs) for treatment by these RBCDs. The RBCDs are secured to a rotating shaft. The rotating shaft and the auger are powered by a quasi-submerged turbine displaced by a flow of air.

Figure 1:
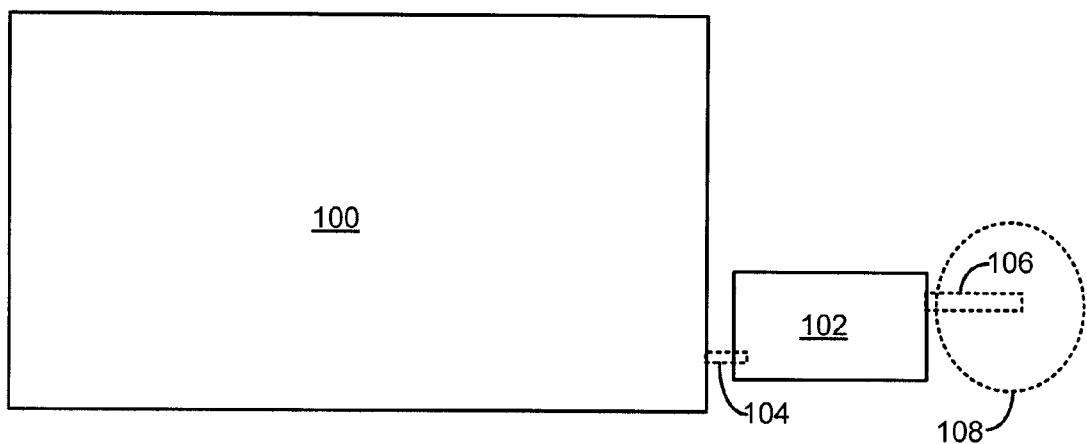
FIG. 1 shows an apparatus of the present invention connected to a house.

FIG. 1 shows a top view of a block representation of a house 100 having its sewage system (not shown) connected, through an inlet 104, to an exemplary embodiment of the sewage treatment apparatus 102 of the present invention. And outlet 106 propagates treated water from the apparatus 102 to a leach field 108, which can also be referred to as a polishing field. In the case of the apparatus 102 treating sewage for three bedroom house, the size of the leach field 108 is typically 10 m² for permeable soils. Although a house 100 is shown at FIG. 1, the sewage treatment apparatus of the present invention can be connected to a group of houses, apartment buildings, cottages, restaurants, stores, or any other suitable type of dwelling that produces sewage and used water. The sewage treatment apparatus 102 will generally be located underground with the inlet 104 also located underground; however, it can also be completely or partially located above ground without departing from the scope of the present invention. As an alternative to be being located outside the house, the apparatus can also be located, for example, in a garage or basement of the house 100.

Figure 2:
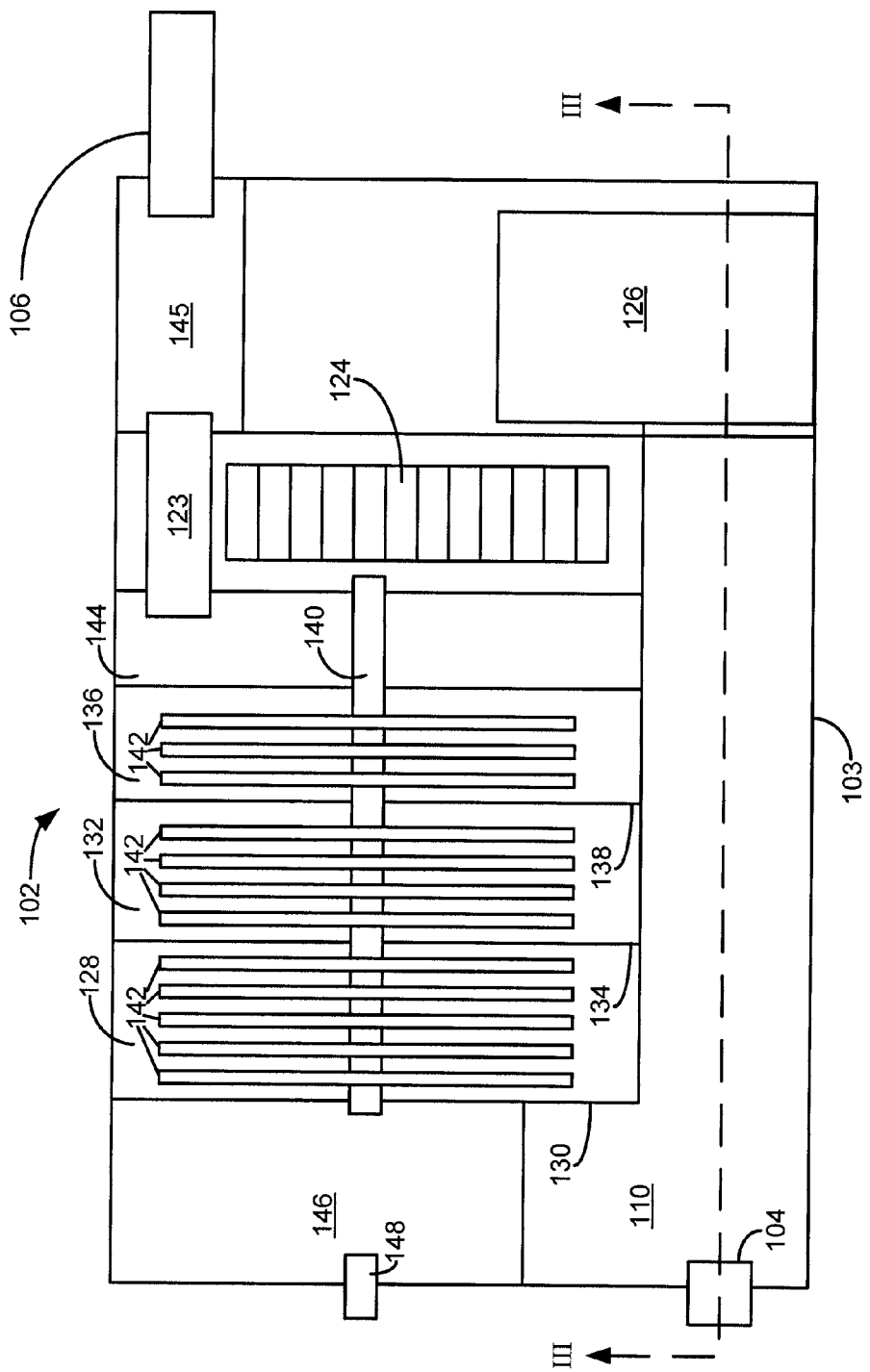
FIG. 2 shows a top view of an exemplary apparatus of the present invention.
Figure 3:
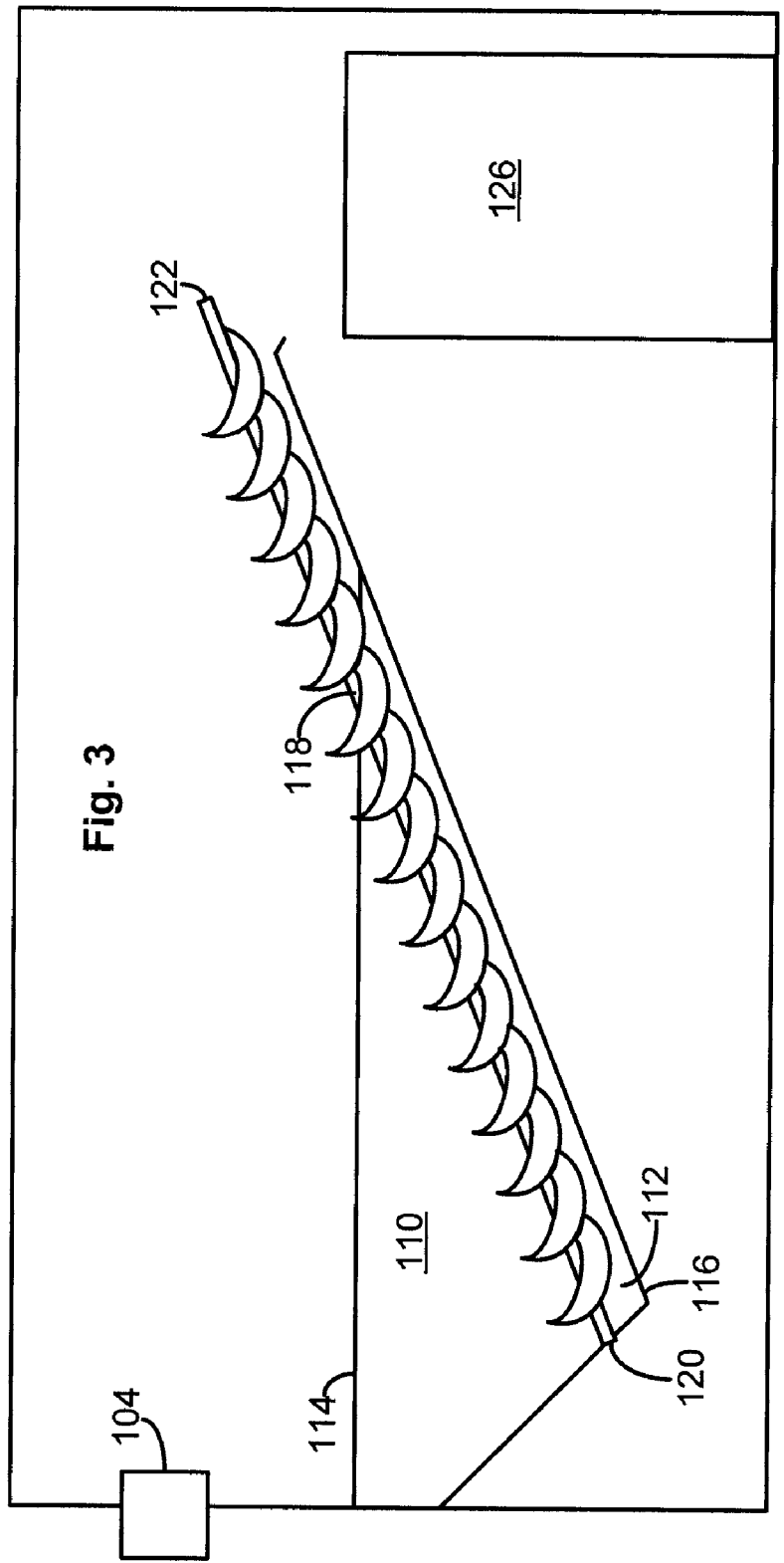
FIG. 3 shows a side view of the apparatus of FIG. 2.

FIG. 2 shows an open, top view of the exemplary apparatus 102. FIG. 3 is a side-elevational view taken along the line III-III of FIG. 2. With respect to FIGS. 2 and 3, the apparatus 102 comprises a housing 103 and a sewage receiver compartment (SRC) 110 formed within the housing 103. The SRC 110 receives sewage from the inlet 104 (sewage inlet). The inlet 104, can be a pipe or any other suitable type of conduit such as, for example, a tube. The sewage spilling into the SRC 110 typically contains matters dissolved in water, as well as undissolved solid waste products. Some of the solid waste products settle, eventually, to the bottom portion 112 of the SRC 110.

FIG. 3 indicates a sewage level 114, above the V-shaped bottom 116 of the SRC 110. Also shown at FIG. 3 is an inclined auger 118 (which can also be referred to as an Archimedes screw) rotatably secured at its first end 120 to the V-shaped bottom 116. As will be described below, a second end 122 of the auger is operationally connected to a turbine 124, shown at FIG. 2. As such, the turbine 124 rotates the auger 118, which displaces the solid matter deposit from the bottom portion 112 to a receptacle 126. At regular intervals, or when required, the receptacle 126 can be removed from the apparatus 102, for example through a hatch (not shown) and emptied to a composting field. This can provide compost, which can be use for horticulture purposes or for any other suitable purposes.

As will be understood by the skilled worker, the bottom of the SRC 110 need not be V-shaped. Rather, the bottom of the SRC 110 can have any suitable convex shape where solid waste products can settle. Further, the first end 120 of the auger 118 need not be secured to the V-shaped bottom 116. Rather, the auger 118 can be mounted within the housing 103 though any suitable means, such as, for example, brackets that position the first end 120 at the bottom portion 112 of the SRC 110.

As will be appreciated by the skilled worker, the benefit of separating solid waste from the sewage to obtain liquid sewage at the outset of sewage treatment is that it diminishes the quantity of materials that can dissolve in the sewage, thereby simplifying the treatment of the liquid sewage.

Figure 4:
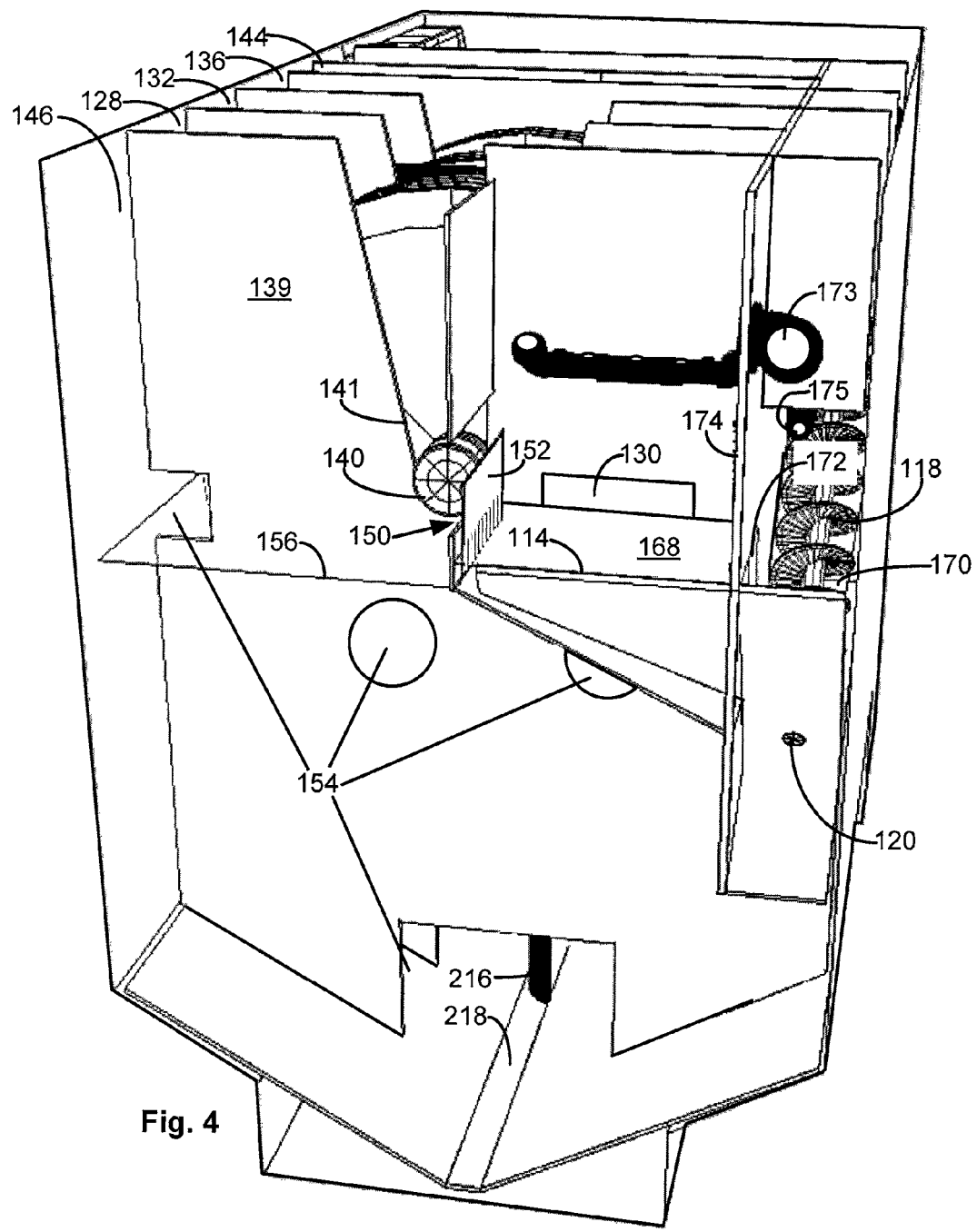
FIG. 4 shows a back perspective view of an apparatus of the present invention.

The apparatus 102 also comprises treatment compartments in which sewage is treated. FIG. 2 shows a first treatment compartment 128, which is in fluid communication with the SRC 110 through an opening 130. The sewage present in the SRC 110 spills from the SRC 110 into the first compartment upon the sewage level 114, shown at FIG. 3, reaching the height of the opening 130. FIG. 4, which is an open, back perspective view of the apparatus 102 also shows the water level 114 and the opening 130. Although the representation of apparatus 102 as shown at FIGS. 2 and 3 differs from that shown at FIG. 4, they are functionally equivalent.

As will be understood by the skilled worker, the apparatus of the present invention can have any number of treatment compartments. For example, with reference to FIG. 2, the apparatus 102 comprises a second treatment compartment 132, which in fluid communication with the first treatment compartment 128 through one or more openings in the first wall 134. The apparatus 102 further comprises a third treatment compartment 136, which is in fluid communication with the second treatment compartment 130 through one or more opening in the second wall 138.

The apparatus 102 comprises a rotatable shaft 140 mounted in the housing 103. As seen at FIG. 4, the rotatable shaft 140 has one end secured at the bottom of a V-shaped groove 141 defined in a wall 139. The rotatable shaft 140 has secured thereto a series of disks 142 made of a biological contactor material (RBCDs). Five, four, and three disks 142 are shown in the first, second, and third treatment compartments (128, 132, and 136) respectively. Practically, the number of discs can depend on the biological load to be treated by the apparatus 102. The disks can be made of plastic, such as, for example, polythene, polyvinyl chloride, polystyrene, expanded polystyrene or of any other suitable material. Although not shown at FIG. 2, but as will be described below, the rotatable shaft 140 is operationally connected to the turbine 124, which rotates the rotatable shaft 140. As will be understood by the skilled worker the shaft can be made of any suitable rigid material such as plastic, high-density polyethylene (HDPE) etc. Further, the rotatable shaft 140 and discs 142 can be hollow and buoyant.

The apparatus of the present invention can also comprise a used water receiver compartment (UWRC) 146 as shown for the apparatus 102 at FIGS. 2 and 4. The UWRC 146 is connected to a used water circuit (not shown) through a used water inlet 148. The used water circuit can include, for example, used water from the household's bath and shower, and clothes washer. The used water circuit is distinct from the sewage system that spills its content in the SRC 110. By having the UWRC 146 separate from the SRC 110, increased dissolution of the solid waste products present in the sewage is avoided upon used water being spilled into the apparatus 102 at the UWRC 146.

As seen at FIG. 4, the UWRC 146 is in fluid communication with the SRC 110 through an overflow opening 150 through which sewage can spill from the SRC 110 into the UWRC 146 upon excessive sewage filling the SRC 110. The overflow opening 150 can have a filter 152 to prevent solids from spilling into the UWRC 146. The filter 152 can be a comb filter or any other suitable type of filter such as, for example, a mesh filter.

Also shown at FIG. 4 are a series of openings 154 defined by the wall 139. The openings 154 allow fluid communication between the UWRC 146 and the first treatment compartment 128. The openings 154 can be of any shape and there can be any number of them. A used water level 156 is also shown at FIG. 4. As will be understood by the skilled worker the used water level 156 is the same as the water level in the first, second and third treatment compartments 128, 132, and 136, since these are all in fluid communication with each other. Further, as shown at FIG. 4, the discs 142 are only partially submerged in the water, so as to enable the discs to pass successively through the sewage and through the air, thereby causing micro-organisms to form on the biological contactor material and to consume a portion of the waste products present in the sewage, to produce treated water.

Figure 5:
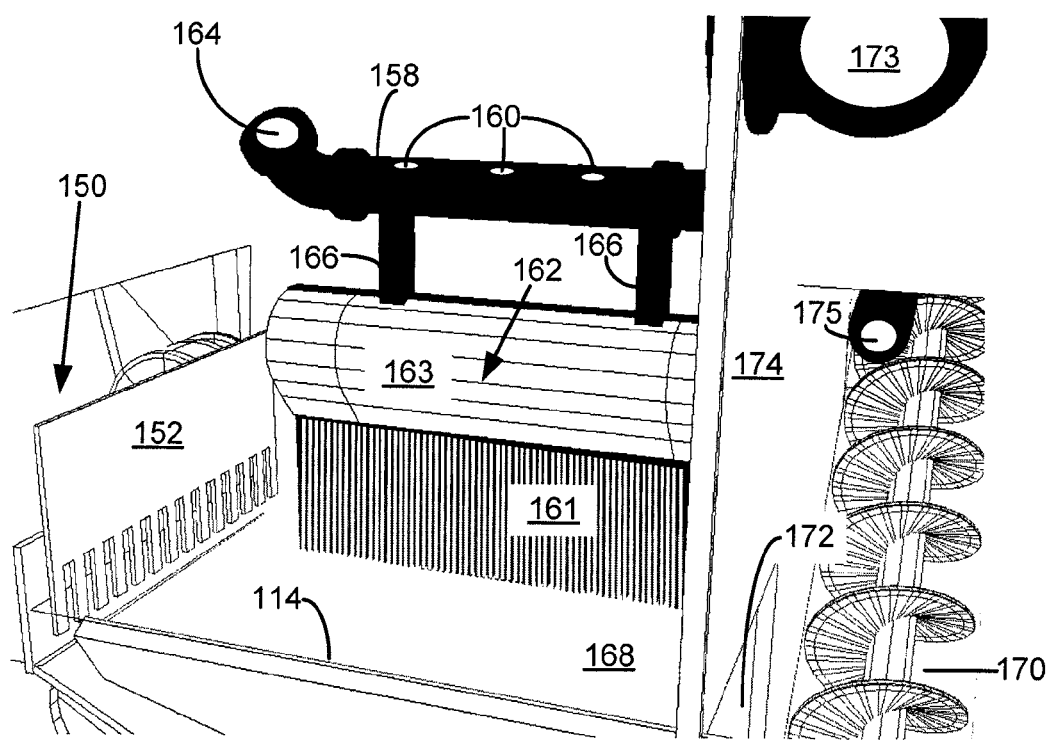
FIG. 5 shows a close up view of the perspective view of FIG. 4.

FIG. 5 shows a close up view of a region of the SRC 110 where the overflow opening 150, the filter 152 and the sewage level 114 are shown. Also shown is a water diffuser 158 that receives treated water from an airlift pump system that will be described below. The treated water provided by the airlift pump to the water diffuser 158 pours out of holes 160 and onto a filter assembly 162 that prevents solids from spilling from the SRC 100 into the first treatment compartment 128.

Although holes 160 are shown at the top portion of the water diffuser 158, holes can be present at the bottom as well, or anywhere on the water diffuser 158. The pouring of water from the diffuser 158 onto the filter assembly 162 serves to clean out the filter assembly 162 of solids present in the filter assembly 162. Further, as will be discussed in more detail below, the airlift pump system re-cycles water from one of the treatment compartments of the apparatus 110 back into the SRC 110. This enables further treatment of the water. The diffuser 158 has an opening 164 that can be accessed by a worker to clean out the diffuser 158 and the airlift pump system with a fish line or with any other suitable flexible cleaning implement.

The filter assembly 162 is shown connected to the water diffuser 158 through brackets 166; however, as will be understood by the skilled worker, the filter assembly can be mounted in the housing 103 in any other suitable manner such as, through brackets connected to any of the walls and partitions of the housing. The filter assembly 162 is shown as including a rounded member 163 on which water from the water diffuser 158 falls. Secured to the rounded member is a fiber filter 161 (in a comb arrangement). Water falling on the rounded member 163 flows on the rounded member 163, spreading itself as it flows down toward the fiber filter. This allows for more thorough cleaning of the fiber filter 161. The fiber filter 161 can include a plurality of fibers 1 mm in diameter, forming a comb filter having a thickness of 6 mm, and spread out over a width covering at least the width of the opening 130. The rounded member can simply be a cut-out section of a conduit. As will be understood by the skilled worker, any other type of filter assembly, coupled or not to a water diffuser can be used without departing from the scope of the present disclosure. As will be further understood by the skilled worker, the apparatus can function even without any filter assembly present.

FIGS. 4 and 5 also show a water outlet 175, which is, as will be described below, also connected to an airlift system. Further, a vent 173 is shown at FIGS. 4 and 5. The vent 173 enables ventilation of the apparatus 102.

As is shown at FIGS. 4 and 5, the SRC 110 of the exemplary apparatus 102 comprises two sections 168 and 170, connected through and opening 172 defined in the partition 174. The sewage inlet 104 spills sewage into section 170. The sewage distributes itself between sections 168 and 170. Any solid waste matter in the sewage present in the section 168 can eventually settle to the slanted bottom of section 168 and, therefrom, slide down towards section 170 where it can settle to the bottom portion 112.

As shown at FIG. 2, the apparatus 102 comprises a sedimentation compartment 144, which is in fluid communication with the third treatment compartment 136. The sedimentation compartment 144 is free of discs 142 and allows for sediments in the sewage/treated water still present in the sedimentation compartment to settle at the bottom thereof. The sedimentation compartment 144 is in fluid communication with a reservoir 145 through a conduit 123. A pump assembly (not shown) can be connected to the reservoir 145 to enable a user to use the treated water present in the reservoir 145 for any suitable purpose such as, for example, watering a lawn or horticulture arrangements.

Figure 6:
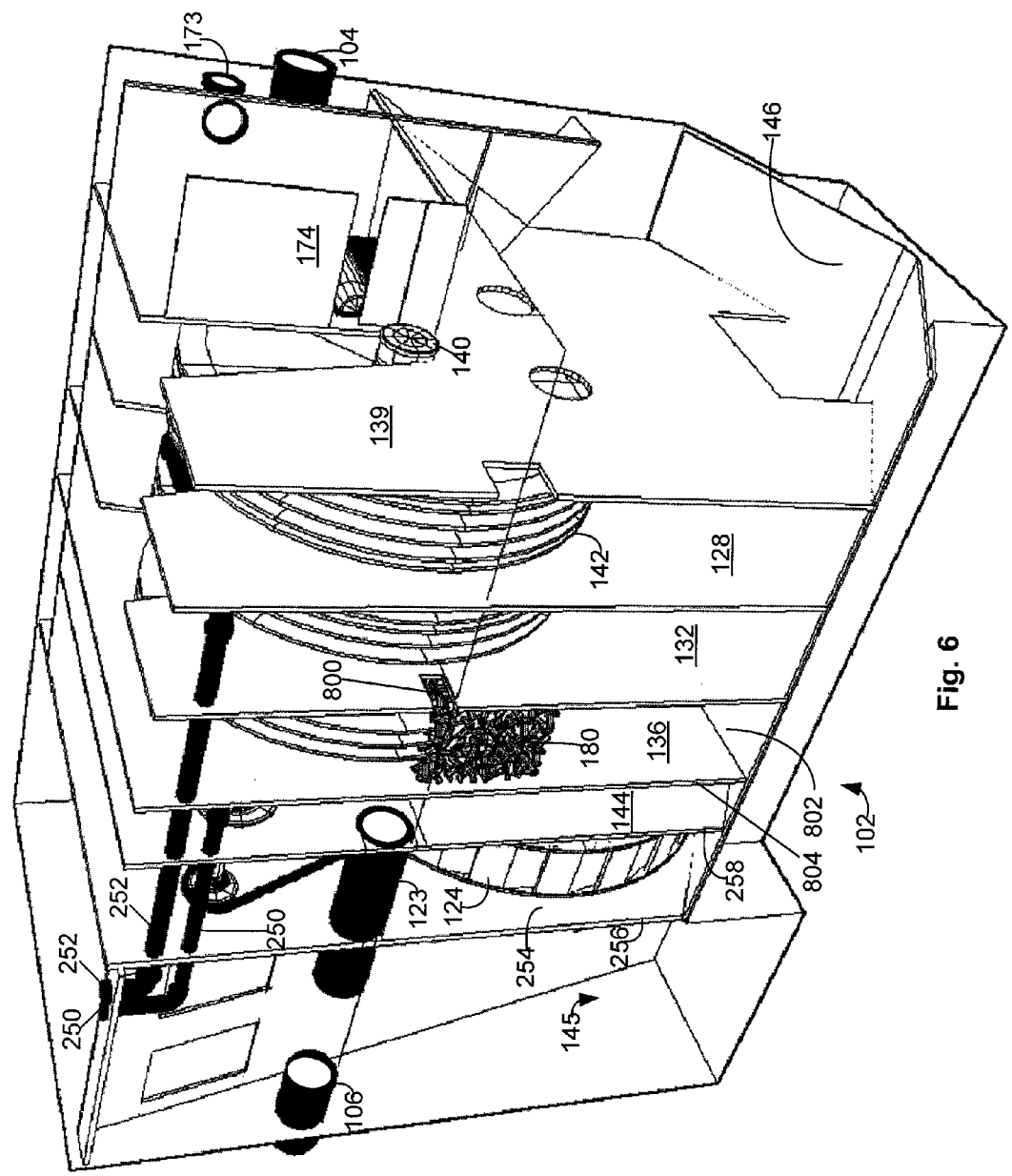
FIG. 6 shows a side perspective view of the apparatus of FIG. 4.

FIG. 6 shows an open, side perspective view of the apparatus 102. As seen at FIG. 6, the third treatment compartment 136 contains filtration media 180 comprising buoyant pieces of material. The material can be the same as that of which the discs 142 are made (for example HDPE, which has a density lighter than that of water). Although not shown at FIG. 6, the third treatment compartment is equipped with an air diffuser positioned below the filtration media 180. The air diffuser supplies a flow of oxygen, present in the air, to the third treatment compartment 136. Agitation of the filtration media is effected mainly given by the rotation of disks in the third treatment compartment 136. The water present in the third treatment compartment 136 being in an advance stage of treatment, combined with: the presence of the filtration media 180, the presence of oxygen and the agitation of the filtration media, allows nitrification to occur continuously in the third treatment compartment 136.

The agitation of the filtration media 180 ensures that matter accumulated on the filtration media parts detaches to allow the treatment process to continue (regenerate). In prior art treatment systems using filtration media, the supply of oxygen to the filtration media has to be sufficiently high to allow agitation of the filtration media. In the apparatus of the present invention, the presence of the rotating discs 142 in the third treatment compartment also causes agitation of the filtration media 180, which reduces the required supply of oxygen compared to prior art systems using filtration media. Although not shown in the figures, small fins can be added to the discs 142 of the third treatment compartment to provide additional water agitation. The agitation of the filtration media 180 pieces allows micro-organisms and matter (biomass) accumulated on the pieces in question, to detach therefrom and settle at the bottom of the apparatus 102.

As will be understood by the skilled worker, once nitrification of the treated water present in the third treatment compartment 136 has occurred, denitrification of the treated water of third treatment compartment 136, or of any compartment downstream from the third treatment compartment 136 (e.g., the sedimentation compartment 144) can be effected by transferring (e.g., by using an airlift pump system) the treated water in question to the SRC 110, for subsequent treatment in the first treatment compartment 128. As will be further understood by the skilled worker, it is the presence of particular organic matter in the first treatment compartment that can allow denitrification to occur.

Figure 7:
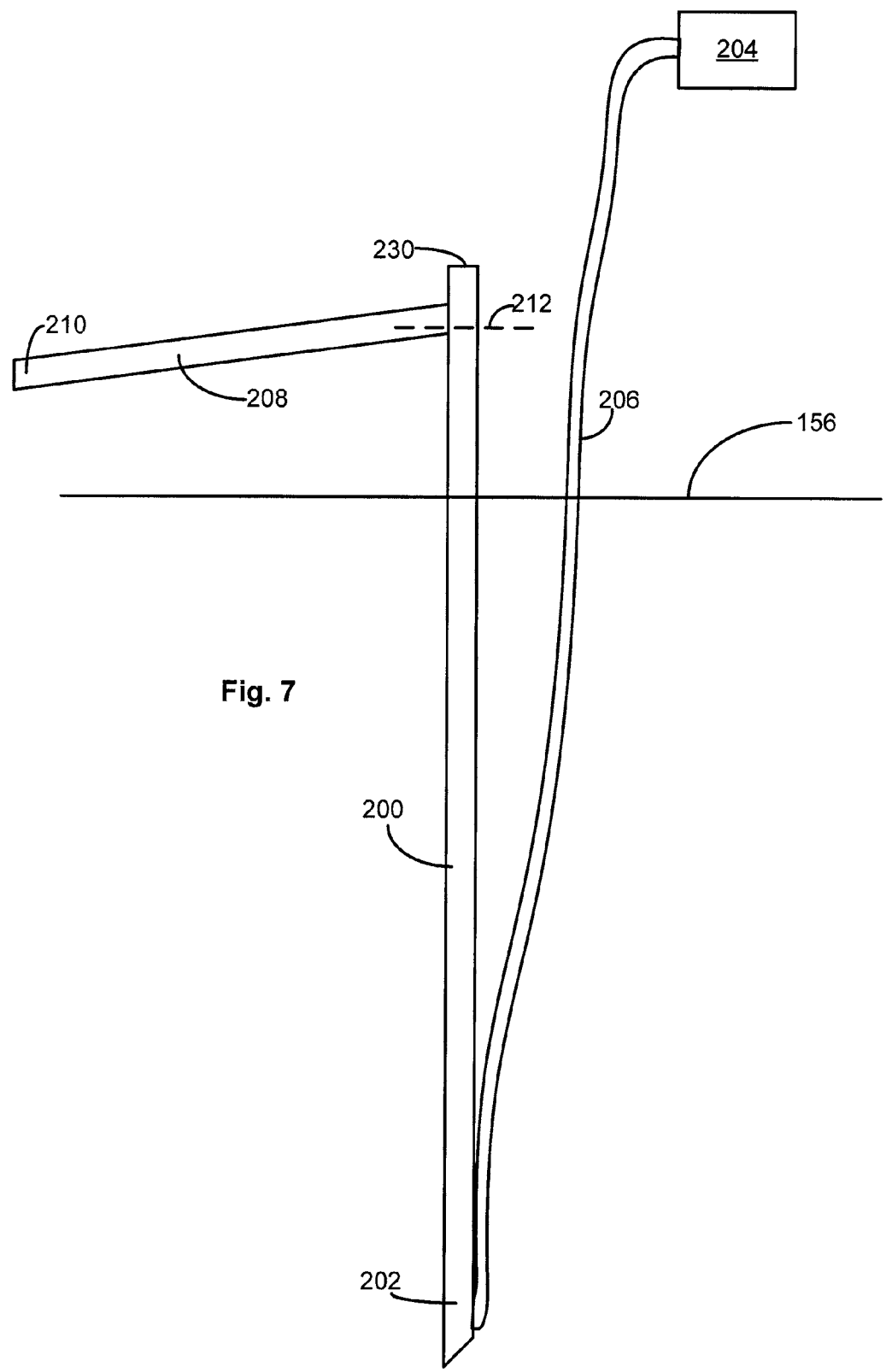
FIG. 7 shows a generic airlift pump system that can be used with the apparatus of FIG. 4.

As mentioned previously in relation to FIG. 5, airlift pump systems can be used in the apparatus 102. In the apparatus 102, the airlift pump systems are used to propagate treated water from any one of the treatment compartment and/or sedimentation compartment to the SRC 110. FIG. 7 shows a generic example of an airlift pump system that can be used in the apparatus 102.

The airlift pump system of FIG. 7 includes a conduit 200 that can be placed in any of the treatment compartments 128, 132, and 136, and/or in the sedimentation compartment 144. A bottom section 202 of the conduit 200 is placed adjacent a bottom portion of the apparatus 102. An air pump 204 is connected to the bottom section 202 through a tube 206. The air pump 204 pumps air to the bottom section 202 to cause bubbles to form in the sewage/treated water present in the bottom section 202. These bubbles reduce the density of the sewage/treated water present in the conduit 200, which causes the level of the sewage/treated water in question to rise above the used water level 156 (sewage/treated water level) shown at FIG. 4. A conduit 208 is connected to the conduit 200. The conduit 208 is slanted towards the SRC 110 and has an output end 210. Upon the level of sewage/used water rising up to connection level 212 of the conduit 208 to the conduit 200, the sewage/used water in the conduit 200 enters the conduit 208 and propagates towards the output end 210. The conduit 200 has another end 230 that can be connected to an access conduit to allow cleaning of the conduit 200. Alternatively, the end 230 can be capped or left open.

As will understood by the skilled worker comparing FIG. 5 to FIG. 7, the water outlet 175 shown at FIG. 5 corresponds to the output end 210 of the conduit 208. Further, FIG. 4 shows a bottom section 216 of a conduit disposed in the second treatment compartment 132, the bottom section 216 being adjacent a bottom 218 of the apparatus 102. The bottom 218 can be trough-shaped as shown at FIG. 4, to allow sediments to accumulate at the bottom of the trough. As will be understood by the skilled worker, in the case of FIG. 4, the bottom section 216 corresponds to the bottom section 202 of the conduit 200 shown at FIG. 7. As previously mentioned the water diffuser 158 and the water outlet 175 are each connected to an airlift pump system. They can be connected to a same airlift pump system or to distinct airlift pump systems. In the latter case, a single pump can be used for both airlift pump systems or each airlift pump system can have its own pump. The air pump or air pumps, which can be diaphragm pumps or any other suitable type of air pump, can be located inside the housing 103 of the apparatus or outside the housing without departing from the scope of the present disclosure. By using airlifts pump systems, sediments settling at the bottom of the treatment compartments and/or sedimentation compartment can be periodically pumped to SRC 110. This overcomes the need to have sludge pumping trucks service the apparatus 102.

FIG. 6 shows a first access conduit 250 connected to an airlift pump system (not shown) pumping water from the sedimentation compartment 144 to the water diffuser 158 of FIG. 5. FIG. 6 further shows a second access conduit 252 connected to another airlift pump system (not shown) pumping water from the second treatment compartment to the water outlet 175 of FIG. 5. Flexible cleaning implements can be introduced in the access conduits 250 and 252 to clean the conduits of their respective airlift pump systems. FIG. 6 also shows the turbine 124 disposed in a turbine compartment 254, between walls 256 and 258.

Figure 8:
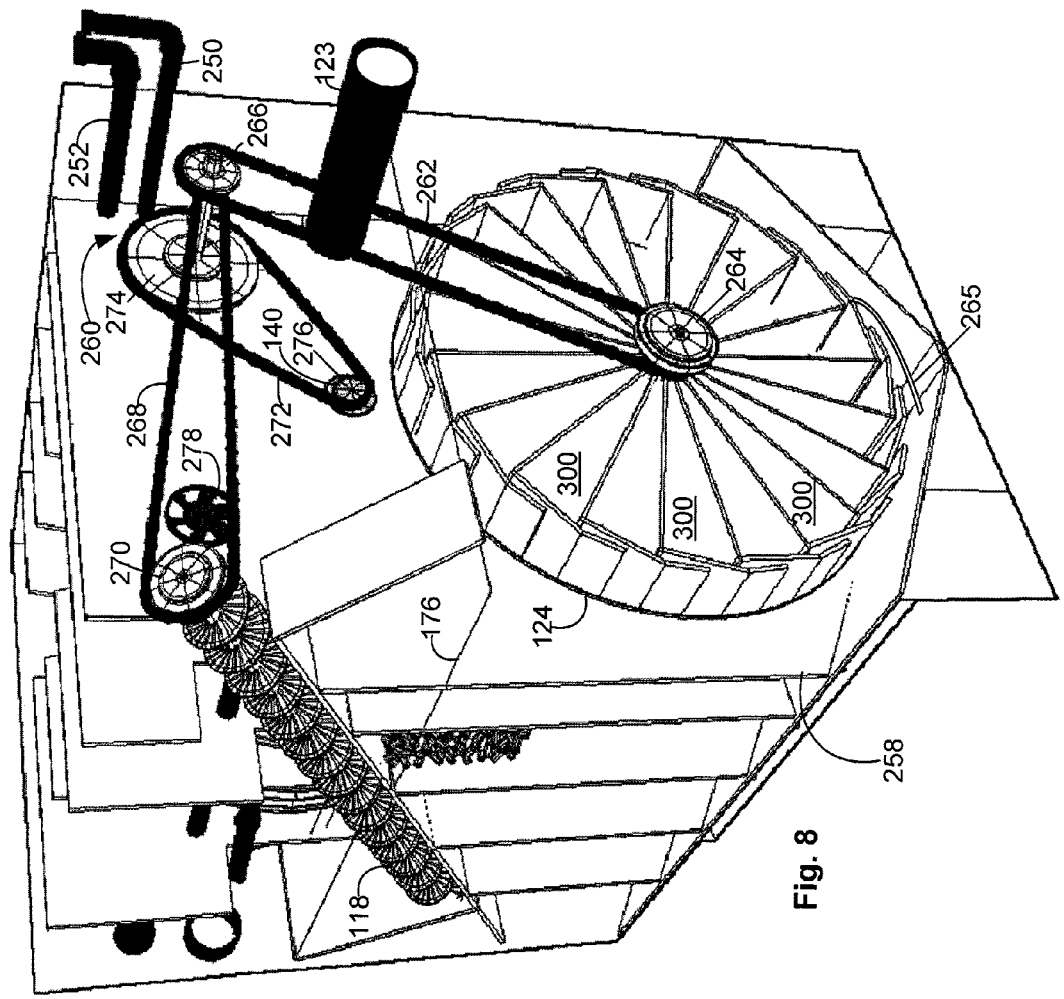
FIG. 8 shows a front perspective view of the apparatus of FIG. 4.

FIG. 8 shows an open, cut-through, perspective view of the apparatus 102. The wall 256 is not shown to allow a better view of the turbine 124 and of its connection to the auger 118 and to the rotatable shaft 140. The turbine 124 is shown as being open in order to view the turbine chambers 300; however, these chambers are covered by a disc-shaped wall, as will be described further below. The turbine is mounted to the walls 256 (not shown) and 258 at a level where it is quasi-completely submerged. An air conduit 265, connected to an air source (e.g., a pump), expresses air which powers the turbine 124.

The turbine 124 is connected to a sprocket assembly 260 secured to the walls 256 (shown at FIG. 6) and 258. A first chain 262 connects the turbine 124 to the sprocket assembly 260. The first chain 262 engages a sprocket (not shown) mounted on a hub 264 of the turbine 124 and a sprocket 266 of the sprocket assembly 260. The sprocket assembly 260 is connected to the auger 118 through a second chain 268 that engages a sprocket (not shown) of the gear assembly 260 and a sprocket 270 of the auger 118. Although not shown, the second end 122 of the auger 118 is rotatably mounted in the housing 103. The sprocket assembly 260 is also connected to the rotatable shaft 140 through a third chain 272 secured to a sprocket 274 of the sprocket assembly 260, and to a sprocket 276 mounted on the rotatable shaft 140.

As the turbine 124 rotates, the sprocket and chain system will turn the auger 118 to displace solid matter deposits from the bottom portion 112 of the SRC 110 to the receptacle 126. Further, as the turbine 124 rotates, the sprocket and chain system will turn the rotatable shaft 140 to cause the discs 142 to successively pass through sewage and air, thereby causing micro-organisms to form on the discs 142 and to consume waste products present in the sewage.

As will be understood by the skilled worker, the size ratio of the sprockets interconnecting the turbine 124 to the auger 118 and to the rotatable shaft 140 determines the rotation speed of the auger 118 and of the rotatable shaft with respect to that of the turbine 124. Typically, the turbine 124 can rotate at 0.3 rotation per minute (rpm), the auger 118 at 0.1 rpm, and the rotatable shaft 140 at 1.3 rpm. As will be understood by the skilled worker, any other suitable rotation speeds can be used depending on various factors, including, for example, the biological load to be treated by the apparatus 102 and the surface area of the discs 142.

As will be understood by the skilled worker, the turbine 124 can be operationally coupled to the auger 118 and the rotatable shaft 140 through any other suitable means such as, by belts and pulleys instead of chains and sprockets.

Although not shown at FIG. 8, the turbine compartment can be in fluid communication with the sedimentation compartment 144 though openings defined in the wall 256 below the water level 176. In such a case, the openings in question can be at the bottom region of the wall 258. Additionally, the bottom of the turbine compartment 254 can be built inclined towards the sedimentation compartment 144 to allow any sediments accumulated in the turbine compartment 254 to slide out of the turbine compartment 254, into the sedimentation compartment 144, where an airlift pump system can be used to transfer these sediments to the SRC 110. Alternatively, the turbine compartment 254 can contain a body of water that does not communicate with that of the sedimentation compartment 144. Further, as shown at FIG. 8, a fan 278 can be positioned in an opening in the wall 258 to provide added ventilation to the apparatus 102.

The rotatable shaft can be held in place at the first one 139 and at the wall 139 (FIG. 4), and at the wall 258, through a bushing assembly (not shown). The rotatable shaft can also be held in place at any wall delimiting the treatment/sedimentation compartments through similar means. As will be described below, the rotatable shaft 140 can be a buoyant (floating) rotatable shaft. Such a floating rotatable shaft is described below. By using a buoyant (floating) shaft of a properly chosen diameter, the use of intermediate support points, and corresponding bushings, at the various treatment compartments can be eliminated. By using a floating shaft most of the friction can be substantially limited to a contact area between the shaft/disk and the water. Vertical loads on the shafts/disks are directly transferred to the water. A floating shaft avoids the need of bearings and bushings, which can greatly simplify long-term maintenance of the apparatus 102. To increase the buoyancy of the shaft/discs, the discs can be hollowed out.

Figure 9A:
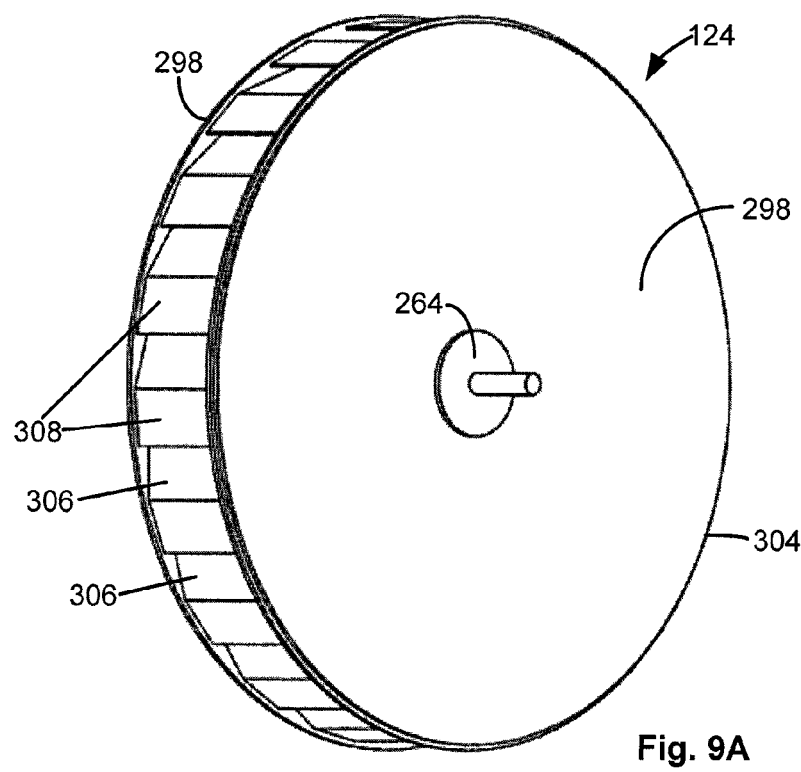
FIGS. 9A and 9B show an embodiment of a turbine that can be used with the apparatus of FIG. 4.
Figure 9B:
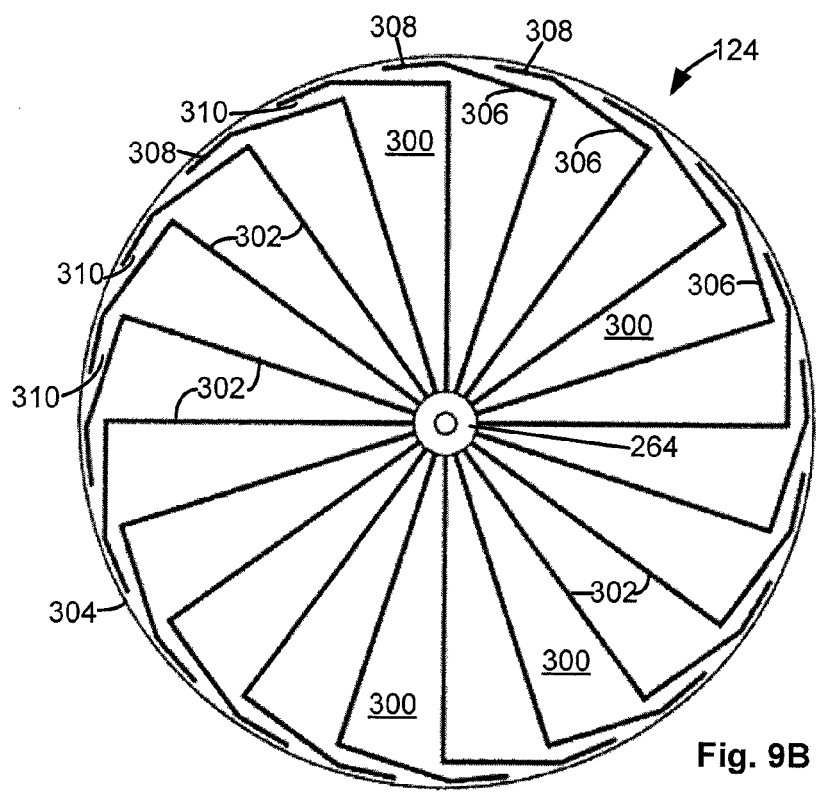

FIGS. 9A and 9B respectively show a perspective view and an open, side view of the turbine 124. The turbine 124 has a pair of spaced-apart, disc-shaped walls 298. First partitions 302 are formed between the disc-shaped walls 298 and each of the first partitions 302 extends radially outwards from the hub 264, towards a perimeter 304 of the disc-shaped walls 298. The angle between adjacent first partitions 302 can be substantially the same for all pairs of adjacent first partitions. The disc-shaped wall 298 and the first partitions 302 define the chambers 300 of the turbine 124.

The turbine 124 has second partitions 306 connected to the disc-shaped walls 298 and to respective first partitions 302. Each of the second partitions 309 and first partitions 302 are at an angle of 90°. However, the angle can be either larger or smaller than 90°. In any case, the angle should be less than 180°.

The turbine 124 further has third partitions 308 that are connected to the disc-shaped walls 298 and to respective second partitions 306. Each of the third partitions 308 and first partitions 302 are at an angle to each other that is less than 90°. Additionally, each of the third partitions 308 extends from its respective second partition 306 over an adjacent second partition 306. This defines a passageway 310 connecting an outside of the turbine 124 to a respective chamber 300. Even though the angle between the third partitions and the first partition is shown at FIG. 9B as being less than 90°, angles of 90° or above could also work.

FIG. 10 shows an open, side view of the turbine 124 in operation. The turbine 124 is quasi-submerged in the water present in the turbine compartment 254. However, the turbine 124 can be totally submerged or partially submerged without departing from the scope of the disclosure. An air source (shown at reference numeral 265 at FIG. 8), located below the turbine 124 produces air that enters the chambers 300 through the passageways 310. This causes water to be expressed out off the chambers 300 that are receiving air. The entry of air in chambers 300 causes the turbine 124 to develop a torque and the turbine 124 to turn in the direction indicated by arrow 312.

As will be understood by the skilled worker, the extension of the third partitions 308 over adjacent second partitions 306 ensures that the compartments 300 retain air therein until the respective passageways 310 turns upwards to allow water to enter the chambers. The longer air stays in the chambers 300, the greater the torque developed by the turbine 124 will be.

The relatively small dimension of the passageways 310 with respect to the chambers 300 causes rapid and prolonged flow of water through the passageways 310 as water enters the turbine 124 to fill the chambers 300. This rapid and prolonged flow of water prevents excessive build up of sediments in the passageways 310 and in the chambers 300. FIG. 11 shows another open, side perspective view of the exemplary apparatus 102. An air conduit 400 can be connected at one end to the fan 278 shown at FIG. 8. The other end of the conduit 400 is connected to an opening in a removable partition 410 that overhangs the receptacle 126, which can be a standard recycling or composting receptacle. FIG. 11 also shows access panels 401 behind which can be stored an electrical pumping system to pump out treated water from the reservoir 145.

Figure 12A:
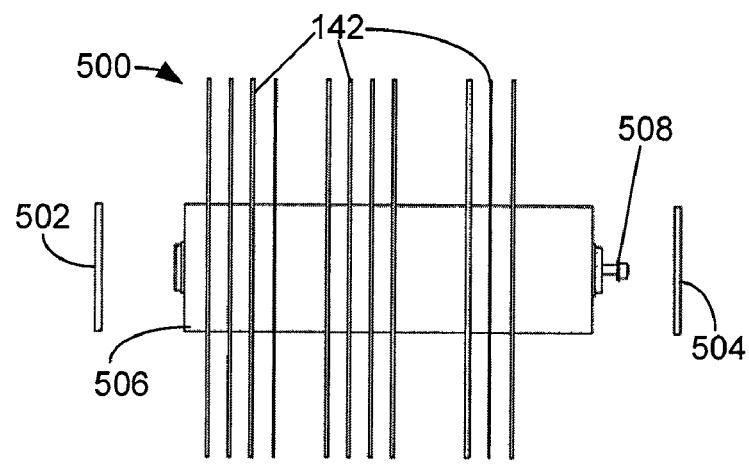
FIG. 12A-12C show and embodiment of a rotatable shaft that can be used with the apparatus of FIG. 4.
Figure 12B:
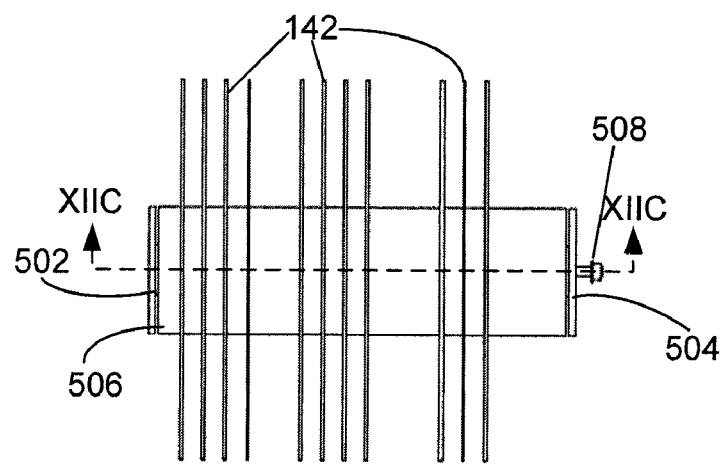
Figure 12C:
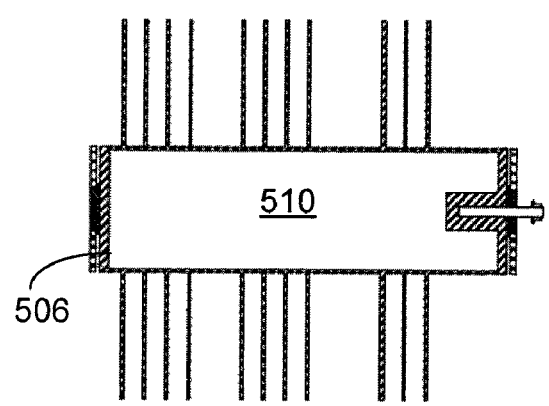

FIGS. 12A-12C show a buoyant rotatable shaft (BRS) 500 to which are secured discs 142. The BRS 500 can be used instead of the rotatable shaft 140 without departing from the scope of the present disclosure. The BRS 500 and the discs 142 can be made of high density polyethylene (HDPE) or of any other suitable material. The BRS 500 includes plates 502 and 504 that are used to slidably secure the BRS 500 within the apparatus 102, as a body 506 and a sprocket 508 for couple to the chain 272 of FIG. 8. FIG. 12A shown the plates 502 and 504 separate from the body 506; FIG. 12B shows the plates 502 and 504 secured to the body 506; and FIG. 12C shows a cross-sectional view of FIG. 12B taken along the line XIIC-XIIC. The inside 510 shown at FIG. 12C is hollow. Further, the discs 142 can be hollow. Manufacturing such hollow discs can include, for example, starting out with two full 0.25 inch thick discs. Subsequently, in each disc, a recess of about 0.125 inch deep is formed (by machining or by any other suitable process). The two discs are then brought together and glued with their recesses facing each other. This produces a hollow disc of 0.5 inch in thickness.

With respect to FIG. 4, in the case where the BRS 500 were used instead of the rotatable shaft 140, the V-shaped groove 141 in the wall 139 could be replaced by a vertical slot. The first plate 500 would be located in the UWRC 146 and be connected to the body 506 of the BRS 500. This would enable a vertical sliding engagement of the BRS 500 with respect to the wall 139. With respect to FIG. 8, the wall 258 would in this case also include a slot and the plate 504 would be located in the turbine compartment 254 and be connected to the body 506 of the BRS 500. This would enable a vertical sliding engagement of the BRS 500 with respect to the wall 258. As such, BRS 500 would effectively float in the used water and would be allow vertical movement to accommodate fluctuations in the used water level 176, or fluctuations in the weight of the BRS 500/discs 142 due to the accumulation of sediments on the discs 142. The chain and sprocket assembly can be assembled such that there is adequate slack in the chain 272. Alternatively, any suitable chain-tensioning device can be used with the chain 272.

As will be understood by the skilled worker, the plates 502 and 504 can be secured to the body 506 though any suitable means such as, for example, by complementary treads on the plates and body, by fasteners, by snap fits, etc.

Figure 13:
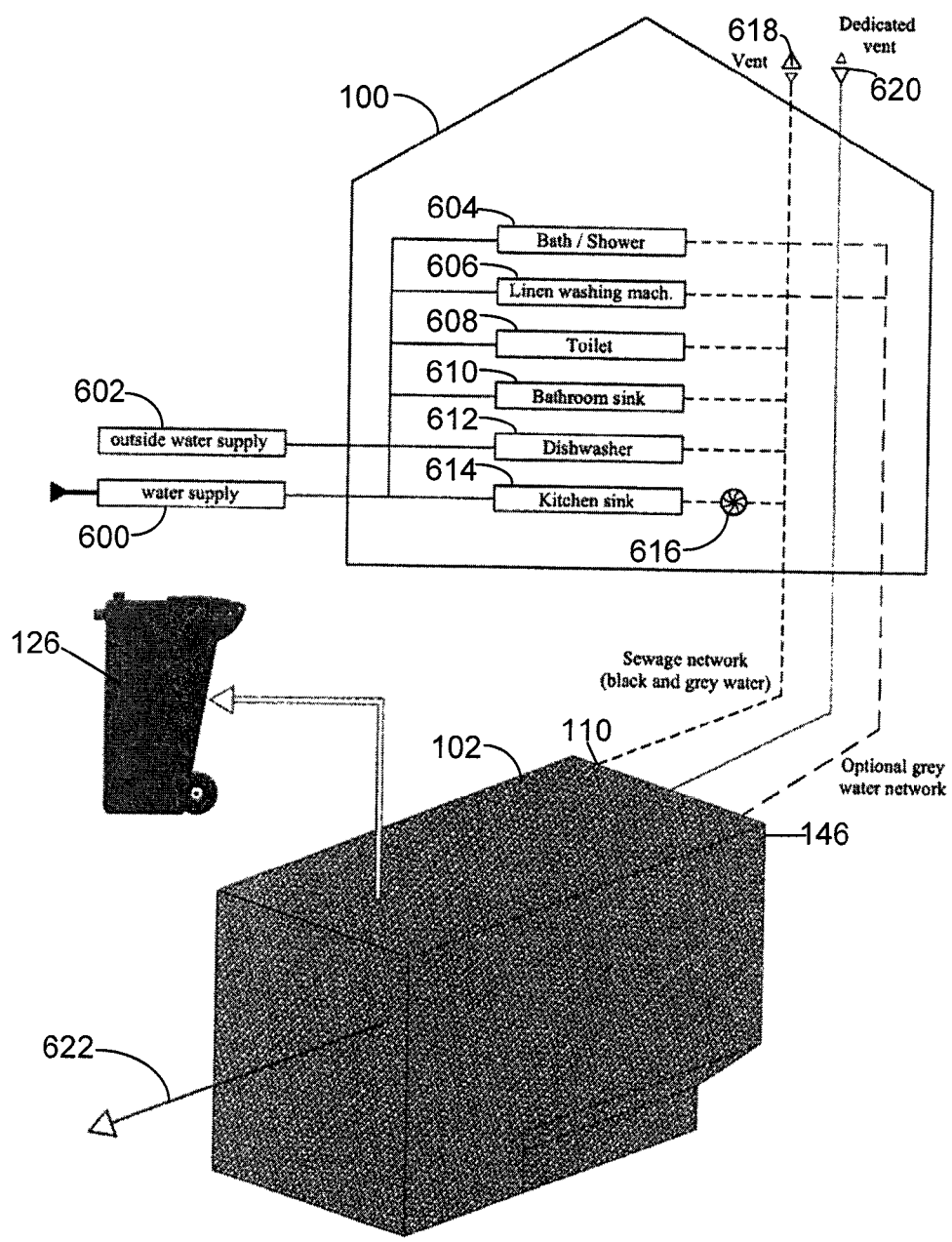
FIG. 13 show how an apparatus of the present invention can be integrated with a house.

FIG. 13 shows an overview of the exemplary apparatus 102 connected to the house 100. The house 100 can have a water supply 600, such as supplied by a well (not shown), and an outside water supply 602, for example, a municipal water supply. The output of the bath/shower 604 and of the linen washer 606 can be connected to the UWRC 146 of the apparatus 102. The output of the toilet 608, the bathroom sink 610, the dishwasher 612, the kitchen sink 614, and the garburator 616 can all be connected to the SRC 110 of the apparatus 102. The house 100 is shown with a vent 618. A dedicated vent 620 can also be connected to the apparatus 102. The receptacle 126 is shown outside the apparatus 102 to indicate that its contents can be emptied to a composting field. The receptacle 126 will typically contain undissolved solids from the toilet 608 and sinks 610 and 614, as well as crushed kitchen waste from the garburator 616. Additionally, as will be understood by the skilled worker, the receptacle 126 can contain mineralized matter obtained through an aerobic decomposition process of the solid waste received at the apparatus 102, as well as matter obtained from an anaerobic decomposition process of the solid waste received at the apparatus 102. As depicted by an arrow 622, the apparatus 102 outputs treated water to a polishing field.

Figure 14:
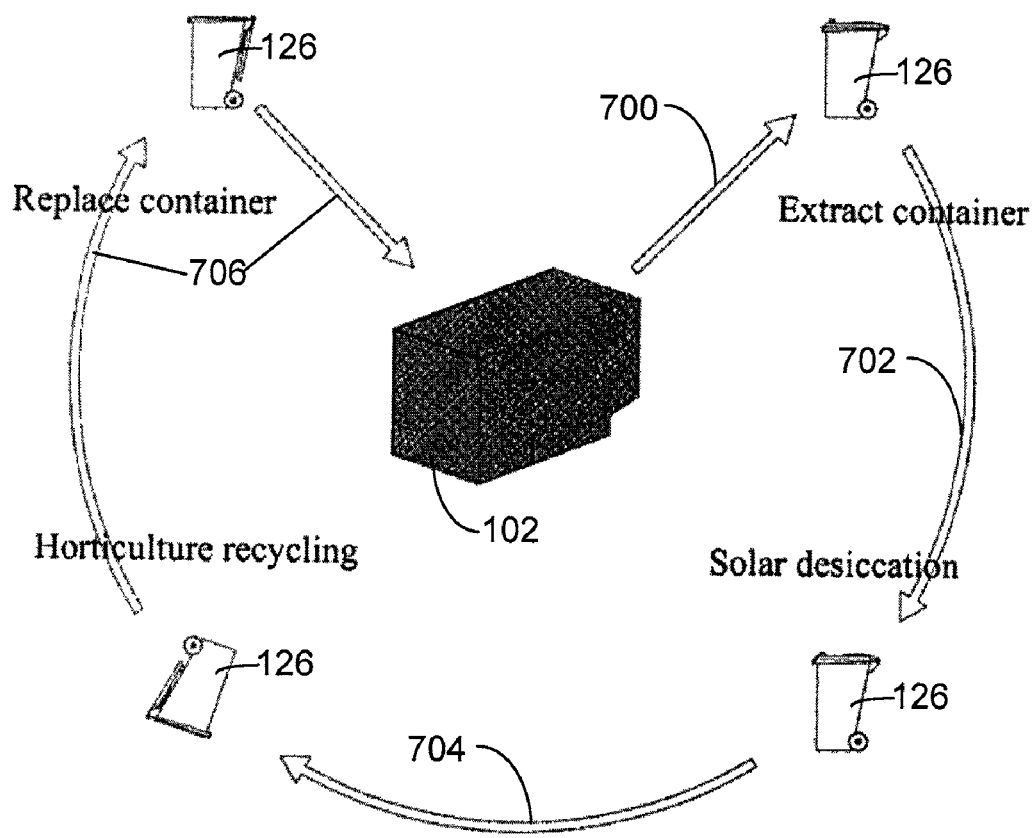
FIG. 14 shows how the solid organic wastes extracted by a method of present invention can be obtained.

FIG. 14 shows an exemplary method for recycling organic matter obtained from the apparatus 102. At step 700, the receptacle 126 is taken out of the apparatus 102 and is exposed to sunlight at step 702. An empty receptacle is substituted to the one taken out of the apparatus 102. The exposure of the receptacle 126 to sunlight during the summer months, allows for destruction of pathogens by dessication. At step 704, the contents of the receptacle 126 is emptied and mixed, in any suitable proportion, with soil. This mixture, once determined safe, could be used immediately as a fertilizer for ornamental horticulture. After a period of time, for example, one year, the soil/organic matter mixture could be used as a fertilizer harvesting crops. At step 706, the emptied receptacle 126 can be returned to the apparatus 102 upon the receptacle installed in the apparatus being removed to go be subjected to steps 702, 704, and 706.

FIG. 15 shows an exemplary method of the present invention for treating sewage. At step 900, sewage is received at a sewage receiving compartment (SRC). At step 902, solids present in the sewage are separated from the sewage. As a result, solids and liquid sewage are produced. As will be understood by the skilled worker, the liquid sewage can still contain solids therein; however these will be in much quantity than that originally received at the SRC. At step 904, the solid are displaced from the SRC towards a receptacle, and at step 906, the solids are extracted from the receptacle.

At step 908, the liquid sewage is provided to a first treatment compartment for treatment by RBCDs. At step 910, the liquid sewage is provided to a second treatment compartment by RBCDs. At step 912, liquid sewage (also referred to simply as sewage or as treated water) from the second compartment is provided to the SRC. Step 912 can occur any number of times during a day for any amount of time (e.g., four times a day, thirty minutes each time).

At step 914, the liquid sewage is provide to a third treatment compartment for treatment by RBCDs and, optionally, by a filtering media (which can also be referred to as a fluidized filter bed treatment). At step 916, the liquid sewage is provided to a sedimentation compartment. At step 918, liquid sewage from the sedimentation compartment is provided to the SRC. Step 918 can occur any number of times during a day for any amount of time (e.g., four times a day, thirty minutes each time). Steps 912 and 918 can occur simultaneously be powered by a same air pump.

Finally, at step 920, the liquid sewage, which at this point is relatively clean treated water, is output to a leach field where any matter still present in the liquid sewage can break down in the leach field.

As will be understood by the skilled worker, the apparatus 102 can be equipped with an alarm system that can signal the break of a chain or the failure of a pump. The alarm can be sent to a service provider for the apparatus 102. Upon detecting the alarm, the service provider can carry out the required maintenance. If a chain fails and/or the rotatable shaft stops turning for any reason, the media in the third treatment compartment will still treat the water. This is advantageous in that the user of the apparatus is not likely to be left without sewage treatment capability. As stated above, the discs 142 in the third treatment compartment can be equipped with fins to increase water agitation. Discs 142 in other treatment compartments can also be equipped with such fins.

In the exemplary apparatus 102 shown at, e.g., FIG. 6, the first treatment compartment 128 is connected to the second treatment compartment 132 through an opening (not shown) at the bottom region of the wall 134 (FIG. 2). As such, sewage flows generally downwardly from the opening 130 through which the sewage is received from the SRC 110, through to the second treatment compartment. This downwardly flow can favor accumulation of solid matter near the junction between the first treatment compartment and the second treatment compartment. As such, an airlift pump system installed at that junction will help re-circulate that solid matter back to the SRC 110.

Further, in the apparatus 102, the second treatment compartment 132 is connected to the third treatment compartment 136 though slots 800 (only one is shown in the example of FIG. 6) in the wall 138. This causes the sewage to flow generally upwardly from the opening at the bottom region of the wall 134 towards the slots 800.

Furthermore, the apparatus 102, the third treatment compartment 136 is connected to the sedimentation compartment 144 through and opening 802 at the bottom of the wall 804. As such, the sewage flows generally downwardly from the slots 800, through to the sedimentation compartment. This downwardly flow can favor accumulation of solid matter near the junction between the third treatment compartment and the sedimentation compartment. As such, an airlift pump system installed at that junction will help re-circulate that solid matter back to the SRC 110.

Although not depicted in the figures, the apparatus of the present invention can be provided with one or more access cover. The apparatus of the present disclosure can be of any suitable size and have any suitable number of treatment compartment and any suitable number of discs. The size, number of discs and/or of treatment compartments will typically be determined by the occupancy of the house/building, or group thereof, to which the apparatus is connected. For a three-bedroom house, the apparatus can have length of 7 feet (about 2.1 m), a width of 3.5 feet (about 1.05 m), and a height of 5.6 feet (about 1.68 m). The size of the polishing field (leach field) for such an apparatus is approximately 10 m². The diameter of the discs 142 (RBCDs) can be of about 2.6 feet (about 78 cm). The spacing between the discs can be of about ¾ inch (about 20 mm). The diameter of the turbine can be about 34 inches (about 70 cm) by 6 inches thick (about 15 cm).

The housing of the apparatus of the present disclosure can be made of any suitable materials such as concrete, aluminum, fiberglass, plastic (for example, polypropylene, polyethylene, polycarbonate, HDPE, etc.), and plastic/resin mixtures. The materials used in fabricating the various compartments, the rotatable shaft, the discs, the turbine etc., in the apparatus can also be made of the above-noted plastics or of any other suitable materials. The components of the apparatus can be secured to each other through any suitable means such as epoxies fasteners etc. Further, the apparatus of the present disclosure can be made in molded sections to be assembled through any suitable process. The molded sections can be made through injections molding or any other suitable molding process.

As will be understood by the skilled worker, although shown with the UWRC 146, the reservoir 145, the filtration media 180, and airlift pump systems the apparatus of the present invention can function without these. Further the apparatus of the present invention can function with any suitable flow of sewage (downwardly, upwardly or other) from one treatment compartment to another without departing from the scope of the present disclosure.

In the preceding description, for purposes of explanation, numerous details are set forth in order to provide a thorough understanding of the embodiments of the invention. However, it will be apparent to one skilled in the art that these specific details are not required in order to practice the invention.

As discussed above, the present invention provides a system and method for treating sewage, rather than at a centralized treatment plant. The system, or apparatus, receives sewage at a receiving compartment and separates solids for liquids at the receiving compartment. The solids can be extracted from the receiving compartment by an auger. The liquid sewage flows through a series of treatment compartment containing RBCDs for treatment by these RBCDs. The RBCDs are secured to a rotating shaft. The rotating shaft and the auger are powered by a quasi-submerged turbine displaced by a flow of air. Advantageously, the apparatus of the present disclosure does not require periodic pumping of sludge by a service truck. Rather, any sediments formed at the bottom of the apparatus is pumped back, a few times a day, into the sewage receiver compartment where sediments can settle and be removed by the auger.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. An apparatus for treating sewage, the sewage including water and waste products, the apparatus comprising:
    a housing;
    a sewage receiver compartment formed within the housing, the sewage receiver compartment having a sewage inlet to receive the sewage therefrom, the sewage receiver compartment having a bottom portion, some of the waste products in the sewage to sink to the bottom portion to form a solid matter deposit;
    a first treatment compartment formed within the housing, the first treatment compartment being in fluid communication with the sewage receiver compartment, the first treatment compartment to receive the sewage from the sewage receiver compartment;
    an auger mounted within the housing, the auger having first and second ends, the first end being disposed at the bottom portion of the sewage receiver compartment;
    a receptacle disposed outside the sewage receiver compartment, adjacent the second end of the auger;
    a rotatable shaft mounted in the housing, the rotatable shaft extending through the first treatment compartment, the rotatable shaft having a biological contactor material secured thereto, the biological contactor material being disposed in the first treatment compartment;
    a turbine compartment formed within the housing in fluid communication with the first treatment compartment;
    a turbine rotatably mounted in the turbine compartment and operationally connected to the rotatable shaft and to the second end of the auger;
    an air source operationally coupled to the turbine, the air source to turn the turbine, the turbine to rotate the rotatable shaft, the biological contactor material successively passing though the sewage, and through air, as the rotatable shaft rotates, the successive passage of the biological contactor material through the sewage and through the air causing micro-organisms to form on the biological contactor material and to consume a portion of the waste products present in the sewage, to produce treated water, the turbine also to rotate the auger, the auger to displace, upon rotation, the solid matter deposit from the bottom portion of the sewage receiver compartment to the receptacle; and
    an outlet in fluid communication with the first treatment compartment, and with a leach field, to output the treated water to the leach field.

2. The apparatus of claim 1, further comprising a filter formed between the sewage receiver compartment and the first treatment compartment, the filter to prevent waste products that have a size greater than a pre-determined size, to flow into the first treatment compartment.

3. The apparatus of claim 2 wherein the biological contactor material includes a first plurality of biological contactor discs.

4. The apparatus of claim 3 wherein the discs are made of a plastic.

5. The apparatus of claim 4 wherein the plastic includes at least one of polythene, polyvinyl chloride, polystyrene, expanded polystyrene, polycarbonate, and polypropylene.

6. The apparatus of claim 3 further comprising a second treatment compartment in fluid communication with the first treatment compartment and with the outlet, the second treatment compartment being located between the first treatment compartment and the outlet, the rotatable shaft extending through the second treatment compartment, the rotatable shaft having a second plurality of biological contactor discs secured thereto, the second plurality of biological contactor discs being disposed in the second treatment compartment, the second plurality of biological contactor discs to further treat the used water, the treated water flowing from the first treatment compartment, through the second treatment compartment towards the outlet.

7. The apparatus of claim 6 further comprising a third treatment compartment in fluid communication with the second treatment compartment and with the outlet, the third treatment compartment being located between the second treatment compartment and the outlet, the rotatable shaft extending through the third treatment compartment, the rotatable shaft having a third plurality of biological contactor discs secured thereto, the third plurality of biological contactor discs being disposed in the third treatment compartment, the third plurality of biological contactor discs to further treat the used water, the treated water flowing from the first treatment compartment, through the second and third treatment compartments towards the outlet.

8. The apparatus of claim 7 wherein at least one of the first, second, third treatment compartments includes positively buoyant filtration media and a second air source to activate the positively buoyant filtration media.

9. The apparatus of claim 8 wherein the positively buoyant filtration media includes a plurality of buoyant pieces.

10. The apparatus of claim 7 further comprising a sedimentation compartment in fluid communication with the third treatment compartment and with outlet, the sedimentation compartment being located between the third treatment compartment and the outlet, the treated water flowing from the first treatment compartment, through the second and third treatment compartments, and through the sedimentation compartment, towards the outlet.

11. The apparatus of claim 10 further comprising a first airlift pump in fluid communication with a bottom region of the sedimentation compartment, the first airlift pump to pump sediments and treated water from the bottom of the sedimentation compartment into the sewage receiver compartment.

12. The apparatus of claim 11 wherein the sediments and treated water pumped by the first airlift pump are directed to flow onto the filter to clean the filter.

13. The apparatus of claim 11 further comprising a second airlift pump in fluid communication with the second treatment compartment, the second airlift pump to pump sediments and treated water from the bottom of the second treatment compartment, into the sewage receiver compartment.

14. The apparatus of claim 13 wherein the first airlift pump and the second airlift pump include access ports for cleaning.

15. The apparatus of claim 10 further comprising a first wall separating the first and second treatment compartments, the first wall defining a first opening between the first and second treatment compartments, the first opening connecting a bottom region of the first treatment compartment to a bottom region of the second treatment compartment, used water spilled from the sewage receiver compartment into the first treatment compartment, flowing downwardly into the first treatment compartment towards the first opening and towards the second treatment compartment.

16. The apparatus of claim 15 further comprising a second wall separating the second and third treatment compartments, the second wall defining a second opening between the second and third treatment compartments, the second opening being at a height greater than a height of the first opening, used water entering the second treatment compartment at the first opening, flowing upwardly in the second treatment compartment towards the second opening and towards the third treatment compartment.

17. The apparatus of claim 16 further comprising a third wall separating the third treatment compartment from the sedimentation compartment, the third wall defining a third opening between the third treatment compartment and the sedimentation compartment, the third opening being a height less than the height of the second opening, used water entering the third treatment compartment at the second opening, flowing downwardly in the third treatment compartment towards the third opening and towards the sedimentation compartment, the outlet having a port in the sedimentation compartment, the port being at a port height greater than the height of the third opening, used water entering the sedimentation compartment at the third opening, flowing upwardly towards the port.

18. The apparatus of claim 17 wherein the outlet includes a treated water reservoir formed between the port and the leach field.

19. The apparatus of claim 1, further comprising a used water receiver compartment to receive, independently from the sewage receiver compartment, used water, the used water receiver compartment being in fluid communication with the first treatment compartment.

20. The apparatus of claim 19 wherein the sewage receiver compartment includes an overflow outlet in fluid communication with the used water receiver compartment, to allow sewage to spill from the sewage receiver compartment into the used water receiver compartment, upon a sewage level in the sewage receiver compartment exceeding a predetermined level.

21. The apparatus of claim 20 wherein the overflow outlet includes a filter to prevent waste products that have a size greater than a pre-determined size, to flow into the used water receiver compartment.

22. The apparatus of claim 1 wherein the first air source is operationally coupled to the turbine though an air conduit having an output end disposed adjacent a bottom of the turbine compartment, the output end to direct air towards the turbine.

23. The apparatus of claim 22 wherein the turbine includes:
a hub;
a pair of spaced-apart, disc-shaped walls;
first partitions formed between the disc-shaped walls, each partition extending substantially radially from the hub towards a perimeter of the disc-shaped walls, the first partitions being substantially equi-angularly-spaced from each other, the disc-shaped walls and adjacent pairs of first partitions defining a plurality of chambers in the turbine;
second partitions connected to the disc-shaped walls and to respective first partitions, each of the second partitions being connected to a respective first partition at a first angle, the first angle being less than 180°; and
third partitions connected to the disc-shaped walls and to respective second partitions, each of the third partitions and its respective first partitions being at a second angle to each other, the second angle being less than 90°, each third partition extending from its respective second partition over an adjacent second partition, to define a passageway connecting an outside of the turbine to a respective chamber, the output end of the air conduit directing air substantially towards an opening of a passageway.

24. The apparatus of claim 1 further comprising a vent fluidly connecting an interior of the apparatus to atmosphere, and a ventilator to create an air flow inside the apparatus.

25. The apparatus of claim 1 further comprising a chain and sprocket assembly to operationally connect the turbine to the auger and to the rotatable shaft.

26. The apparatus of claim 1 wherein the rotating shaft is a buoyant shaft.

27. The apparatus of claim 1 wherein the apparatus includes a trough-shaped bottom.

* * * * *